July 29, 1924.

J. P. MEYER

ATTACHMENT FOR GAS ENGINES

Filed July 23, 1923

1,503,371

Inventor
Joseph P. Meyer.

By Horace C. ——
Attorney

Patented July 29, 1924.

1,503,371

UNITED STATES PATENT OFFICE.

JOSEPH P. MEYER, OF MAPLETON, IOWA.

ATTACHMENT FOR GAS ENGINES.

Application filed July 23, 1923. Serial No. 653,280.

*To all whom it may concern:*

Be it known that I, JOSEPH P. MEYER, a citizen of Germany, residing at Mapleton, in the county of Monona, State of Iowa, have invented certain new and useful Improvements in Attachments for Gas Engines; and I do hereby declare the following to be a full, clear, and exact description of the invention, such as will enable others skilled in the art to which it appertains to make and use the same.

This invention relates to new and useful improvements in attachments for automobile gas engines, and particularly to devices for controlling the flow of the gaseous mixture to the intake manifold.

One object of the invention is to provide a device which is arranged to be placed between the carburetor and the intake manifold, for the purpose of causing the gaseous mixture to be discharged into the manifold in a large number of fine streams.

Another object is to provide such an attachment which will permit an auxiliary supply of atmospheric air to be drawn into the gaseous mixture before such mixture passes into the manifold.

Other objects and advantages will be apparent from the following description when taken in connection with the accompanying drawing.

Figure 1:
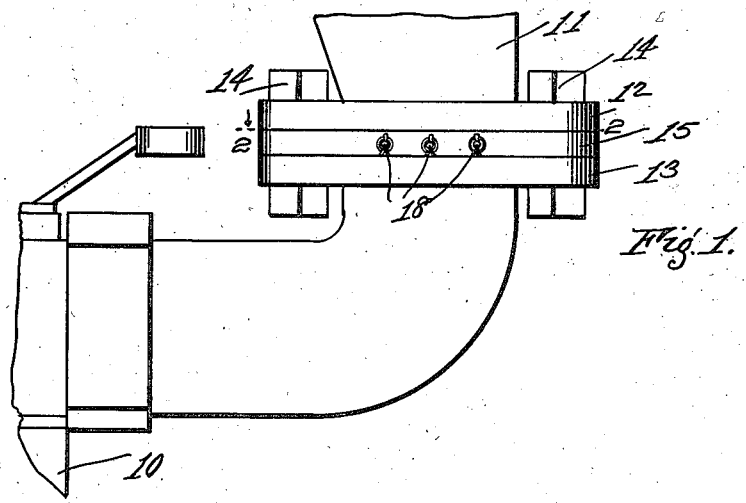
Figure 1 is an elevation of a portion of a carburetor and intake manifold, showing the invention therein.
Figure 2:
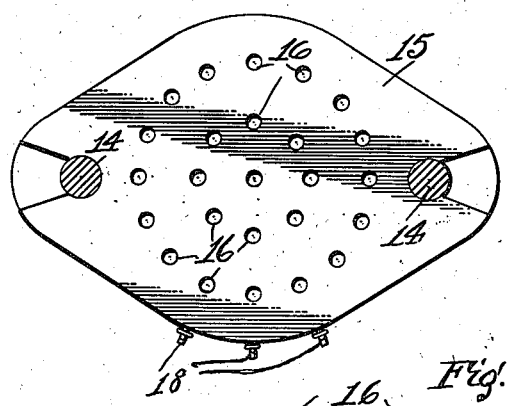
Figure 2 is an enlarged horizontal sectional view on the line 2—2 of Figure 1, taken just above the apertured plate.

Referring particularly to the accompanying drawing, 10 represents a portion of a carburetor, and 11 a portion of an intake manifold, the same being provided with the apertured flanges 12 and 13, respectively. Disposed between these flanges, and secured in place by the bolts 14, which also pass through the flanges 12 and 13, is a metal plate 15. The portion of the plate 15, whose area equals the area of the bores of the carburetor and intake manifold, is formed with a plurality of openings 16 of conical form, the smaller ends being uppermost, or at the upper face of the plate. Formed through one edge of the plate 15, and communicating with several of the openings 16, are the openings 17, and located in each of these openings 17 is a spring pressed air intake valve 18, said valve being arranged to open inwardly toward the openings 16, to permit atmospheric air to pass into the gaseous mixture as it flows to the intake manifold. By forming these openings 16 of conical shape, the gaseous mixture will be reduced in area, and injected into the intake manifold in very fine streams, whereby the engine cylinders will receive the proper amount of mixture for the successful operation of the engine, and thereby obviate the injection of a mixture which is too rich.

Figure 4:
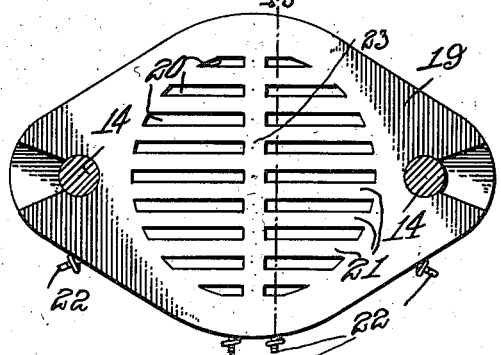
Figure 4 is a plan view of a modified form of plate, wherein are provided parallel bars instead of openings.
Figure 3:
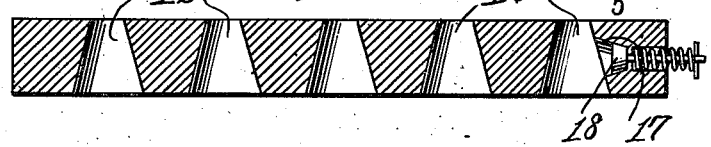
Figure 3 is a vertical transverse sectional view through the apertured plate.
Figure 5:
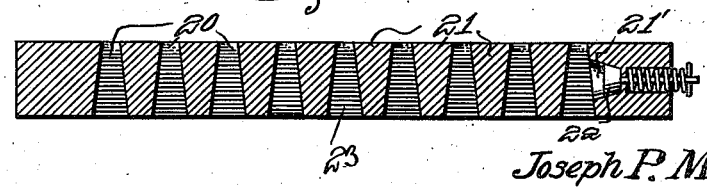
Figure 5 is a vertical transverse sectional view on the line 5—5 of Figure 4.

In the form shown in Figures 4 and 5, instead of forming circular openings in the plate 19, there are formed transverse parallel slots 20, in the area of the plate corresponding to that in which the openings of the first form are made, the resultant bars 21 being approximately triangular in cross section, as seen in Figure 5, so that the slots will be narrow at the upper sides and wide at the lower sides, the gaseous mixture passing from these slots, into the intake manifold, in very thin sheets. Formed through one edge of the plate 19, are openings 21, similar to the openings 17, and in each of these openings is located an inwardly opening spring pressed valve 22, for permitting atmospheric air to be drawn into the adjacent slot of the plate, in a manner similar to that of the first form.

It will be understood that, although I have illustrated the device as formed with circular openings and slots, the diameter of the openings, and the widths of the slots may be varied according to the conditions of the work, or the desire of the user. Thus, by using plates with openings or slots of different sizes, the amount of gaseous mixture which will pass therethrough, will be governed, and the speed of the engine correspondingly controlled.

What is claimed is:

1. An attachment for a gas engine comprising a plate interposed between the carburetor and intake manifold of the engine and provided with a plurality of conical openings having their smaller ends directed toward the said manifold, and valved air intakes in the edge portion of the plate.

2. A baffle for a fuel conduit comprising a plate having a plurality of tapered passages opening through both wider faces of the plate, said plate having valved air intake openings in its edge portion communicating with certain of the tapered passages.

In testimony whereof, I affix my signature, in the presence of two witnesses.

JOSEPH P. MEYER.

Witnesses:
C. G. WHITING,
VIOLET HAESSIG.